US010565685B2

(12) United States Patent
Adler et al.

(10) Patent No.: US 10,565,685 B2
(45) Date of Patent: Feb. 18, 2020

(54) DENOISING BINNED-DEPTH IMAGES (71) Applicant: Disney Enterprises, Inc., Burbank, CA (US)

(72) Inventors: David M. Adler, Valley Glen, CA (US); Delio Aleardo Vicini, Bern (CH); Brent Burley, Monterey Park, CA (US); Jan Novak, Zurich (CH); Fabrice Pierre Armand Rousselle, Ostermundigen (CH)

(73) Assignee: Disney Enterprises, Inc., Burbank, CA (US)

(*) Notice: Subject to any disclaimer, the term of this patent is extended or adjusted under 35 U.S.C. 154(b) by 119 days.

(21) Appl. No.: 15/635,103

(22) Filed: Jun. 27, 2017

(65) Prior Publication Data
US 2018/0286018 A1 Oct. 4, 2018

Related U.S. Application Data (60) Provisional application No. 62/479,125, filed on Mar. 30, 2017.

(51) Int. Cl.
G06T 5/00 (2006.01)

(52) U.S. Cl.
CPC .... G06T 5/002 (2013.01); G06T 2207/10028 (2013.01); G06T 2207/20182 (2013.01)

(58) Field of Classification Search
None
See application file for complete search history.

(56) References Cited

U.S. PATENT DOCUMENTS

| 10,007,974 | B2 * | 6/2018 | Nazemi | G06T 5/40 |
| 2012/0213450 | A1 * | 8/2012 | Shirley | G06T 5/002 382/260 |
| 2016/0098820 | A1 * | 4/2016 | Rousselle | G06T 5/002 345/426 |

OTHER PUBLICATIONS

Henning, et al. "Path-space Motion Estimation and Decomposition for Robust Animation Filtering." *Computer Graphics Forum (Proceedings of EGSR)*. Jun. 2015. pp. 1-12.
Zwicker, et al. "Recent Advances in Adaptive Sampling and Reconstruction for Monte Carlo Rendering." *Computer Graphics Forum (Proceedings of Eurographics)*. May 2015. pp. 1-16.
Rouselle, et al. "Adaptive Rendering with Non-Local Means Filtering." *ACM Transactions on Graphics*. Nov. 2012. pp. 1-12.

(Continued)

*Primary Examiner* — Vikkram Bali
(74) *Attorney, Agent, or Firm* — Farjami & Farjami LLP (57) ABSTRACT

According to one implementation, an image rendering system includes a computing platform having a hardware processor and a system memory storing an image denoising software code. The hardware processor executes the image denoising software code to receive an image file including multiple pixels, each pixel containing multiple depth bins, and to select a pixel including a noisy depth bin from among the pixels for denoising. The hardware processor further executes the image denoising software code to identify a plurality of reference depth bins from among the depth bins contained in one or more of the pixels, for use in denoising the noisy depth bin, and to denoise the noisy depth bin using an average of depth bin values corresponding respectively to each of the reference depth bins.

20 Claims, 4 Drawing Sheets (56) References Cited

OTHER PUBLICATIONS

Manzi, et al. "Regularizing Image Reconstruction for Gradient-Domain Rendering with Feature Patches." *Computer Graphics Forum*, May 2016. pp. 1-11.
Moon, et al. "Robust Image Denoising using a Virtual Flash Image for Monte Carlo Ray Tracing." *Computer Graphics Forum*, Jan. 2013. pp. 1-13.
Li, et al. "SURE-based Optimization for Adaptive Sampling and Reconstruction." *ACM Transactions on Graphics*, Nov. 2012. pp. 1-10.
Keller, et al. "The Path Tracing Revolution in the Movie Industry." *SIGGRAPH*, Aug. 2015. pp. 1-7.
Buades, et al. "A Review of Image Denoising Algorithms, with a New One." *SIAM Journal on Multiscale Modeling and Simulation: A SIAM Interdisciplinary Journal*, Jan. 2005. pp. 1-42.
Bitterli, el al. "Nonlinearly Weighted First-order Regression for Denoising Monte Carlo Renderings." *Computer Graphics Forum*, Jun. 2016. pp. 1-11.
Rouselle, et al. "Robust Denoising using Feature and Color Information." *Computer Graphics Forum*, Oct. 2013. pp. 1-10.

* cited by examiner

DENOISING BINNED-DEPTH IMAGES

RELATED APPLICATIONS

The present application claims the benefit of and priority to a Provisional Patent Application Ser. No. 62/479,125, filed Mar. 30, 2017, and titled "Denoising Binned-Depth Images," which is hereby incorporated fully by reference into the present application.

BACKGROUND

Deep compositing is an image rendering technique for generating complex images from multiple sources. Unlike "flat" images used in traditional compositing, in which each pixel includes a single pixel value, each deep pixel of a deep image can contain multiple pixel values representing contributions from objects at different camera depths. Having multiple depth bin values available to the compositor advantageously enables capabilities such as inserting atmosphere, or isolating color corrections and lighting adjustments to particular depths.

Unfortunately, however, rendered images, flat images as well as deep images, are often plagued with residual noise produced during their rendering. Although sophisticated sampling strategies can reduce the noise, avoiding it completely inside the renderer is nearly impossible. Moreover, although post rendering denoising techniques capable of producing high-quality outputs for flat images exist, none of those existing techniques can preserve depth decompositions as required for the denoising of deep images.

SUMMARY

There are provided systems and methods for denoising binned-depth images, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, deep compositing is an image rendering technique for generating complex images from multiple sources. Unlike "flat" images used in traditional compositing, in which each pixel includes only a single pixel value, each deep pixel of a deep image can contain multiple pixel values representing contributions from objects at different camera depths.

It is noted that because each pixel of a deep image may have multiple pixel values with individual representative depths, processing all depths can often be prohibitive. As a result, the individual representative depths within a single deep pixel can be clustered or "binned," resulting in a reduced set of binned-depth deep pixels, i.e., each depth bin value (including for example depth, color, and features) is a combination of the pixel values clustered for a particular binned-depth. Having multiple depth bin values available to the compositor advantageously enables capabilities such as inserting atmosphere, or isolating color corrections and lighting adjustments to particular depths, while limiting the number of depth bin values through binning allows the processing of those depth bin values to remain tractable.

Unfortunately, however, and as further stated above, rendered images, flat images as well as deep images, are often plagued with residual noise produced during their rendering. Although sophisticated sampling strategies can reduce the noise, avoiding it completely inside the renderer is nearly impossible. Moreover, although post rendering denoising techniques capable of producing high-quality outputs for flat images exist, none of those existing techniques can preserve depth decompositions as required for the denoising of deep images.

The present application discloses a denoising solution for binned-depth deep images that overcomes the drawbacks and deficiencies in the conventional art. The present denoising solution utilizes reference depth bins in a neighborhood of a noisy depth bin to denoise the noisy depth bin. Denoising of the noisy depth bin is performed using an average of the depth bin values corresponding respectively to each of the reference depth bins. In addition, one or more confidence factors can be determined for expressing the average of the depth bin values used to denoise the noisy depth bin as a weighted combination of those depth bin values. As a result, the present application discloses a denoising solution that advantageously preserves depth decompositions, thereby enabling the generation of high-quality, clean, denoised deep images.

Figure 1:
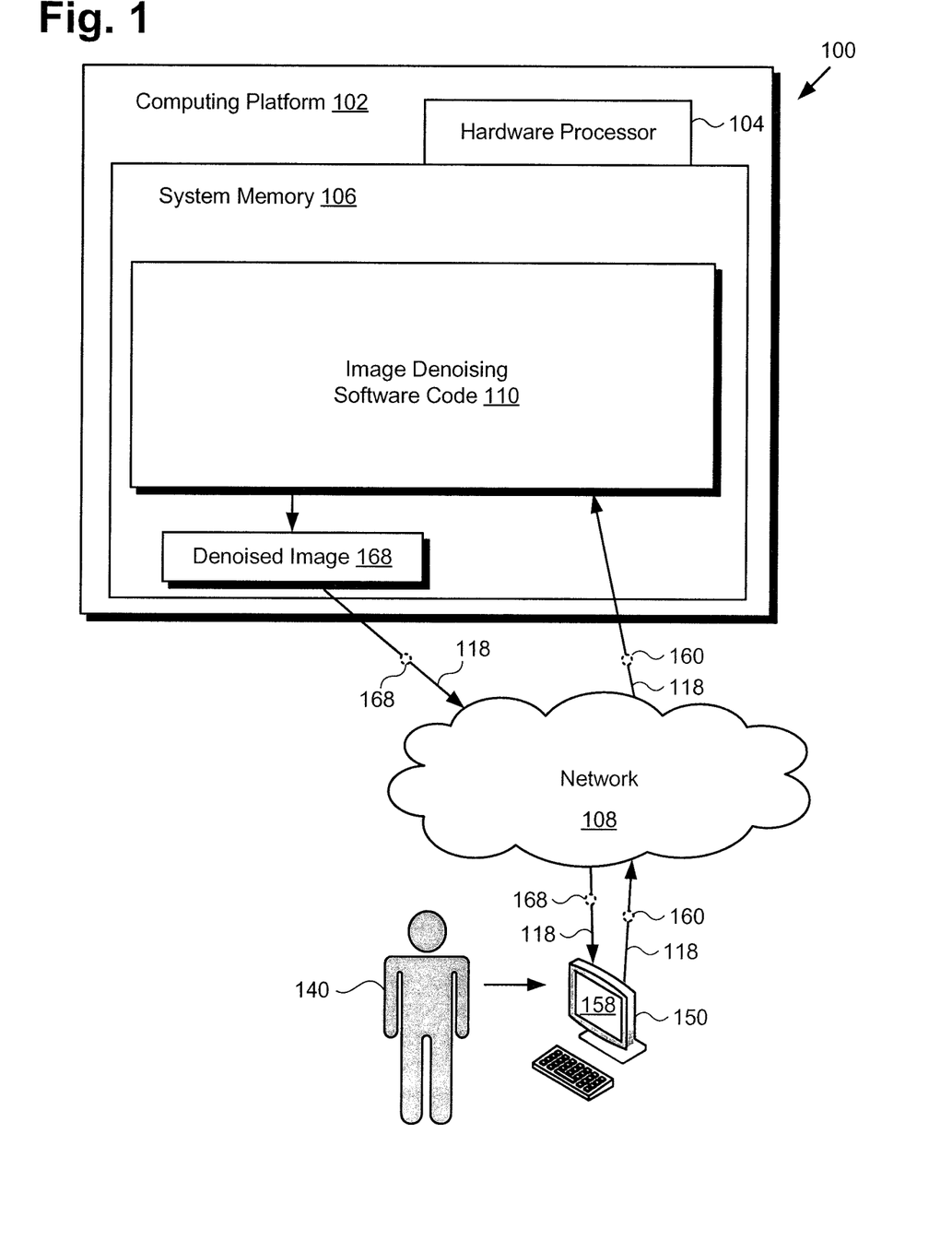
FIG. 1 shows a diagram of an exemplary image rendering system for denoising binned-depth images, according to one implementation.

FIG. 1 shows a diagram of an exemplary image rendering system for denoising binned-depth images, according to one implementation. As shown in FIG. 1, image rendering system 100 includes computing platform 102 having hardware processor 104, and system memory 106 implemented as a non-transitory storage device. According to the present exemplary implementation, system memory 106 stores image denoising software code 110.

As further shown in FIG. 1, image rendering system 100 is implemented within a use environment including communication network 108, user device 150 including display 158, and user 140 utilizing user device 150. Also shown in FIG. 1 are network communication links 118 interactively connecting user device 150 and image rendering system 100 via communication network 108, image file 160, and denoised deep image 168 produced using image denoising software code 110.

It is noted that although FIG. 1 depicts image denoising software code 110 as being stored in its entirety in memory 106, that representation is merely provided as an aid to conceptual clarity. More generally, image rendering system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within image rendering system 100. Thus, it is to be understood that various portions of image denoising software code 110, such as one or more of the features described below by reference to FIG. 4, may be stored and/or executed using the distributed memory and/or processor resources of image rendering system 100.

According to the implementation shown by FIG. 1, user 140 may utilize user device 150 to interact with image rendering system 100 over communication network 108. In one such implementation, image rendering system 100 may correspond to one or more web servers, accessible over a packet-switched network such as the Internet, for example. Alternatively, image rendering system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a laptop computer, tablet computer, or smartphone, for example. User 140 may utilize user device 150 to interact with image rendering system 100 to use image denoising software code 110, executed by hardware processor 104, to produce denoised deep image 168.

It is noted that, in various implementations, denoised deep image 168, when produced using image denoising software code 110, may be stored in system memory 106 and/or may be copied to non-volatile storage (not shown in FIG. 1). Alternatively, or in addition, as shown in FIG. 1, in some implementations, denoised deep image 168 may be sent to user device 150 including display 158, for example by being transferred via network communication links 118 of communication network 108. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
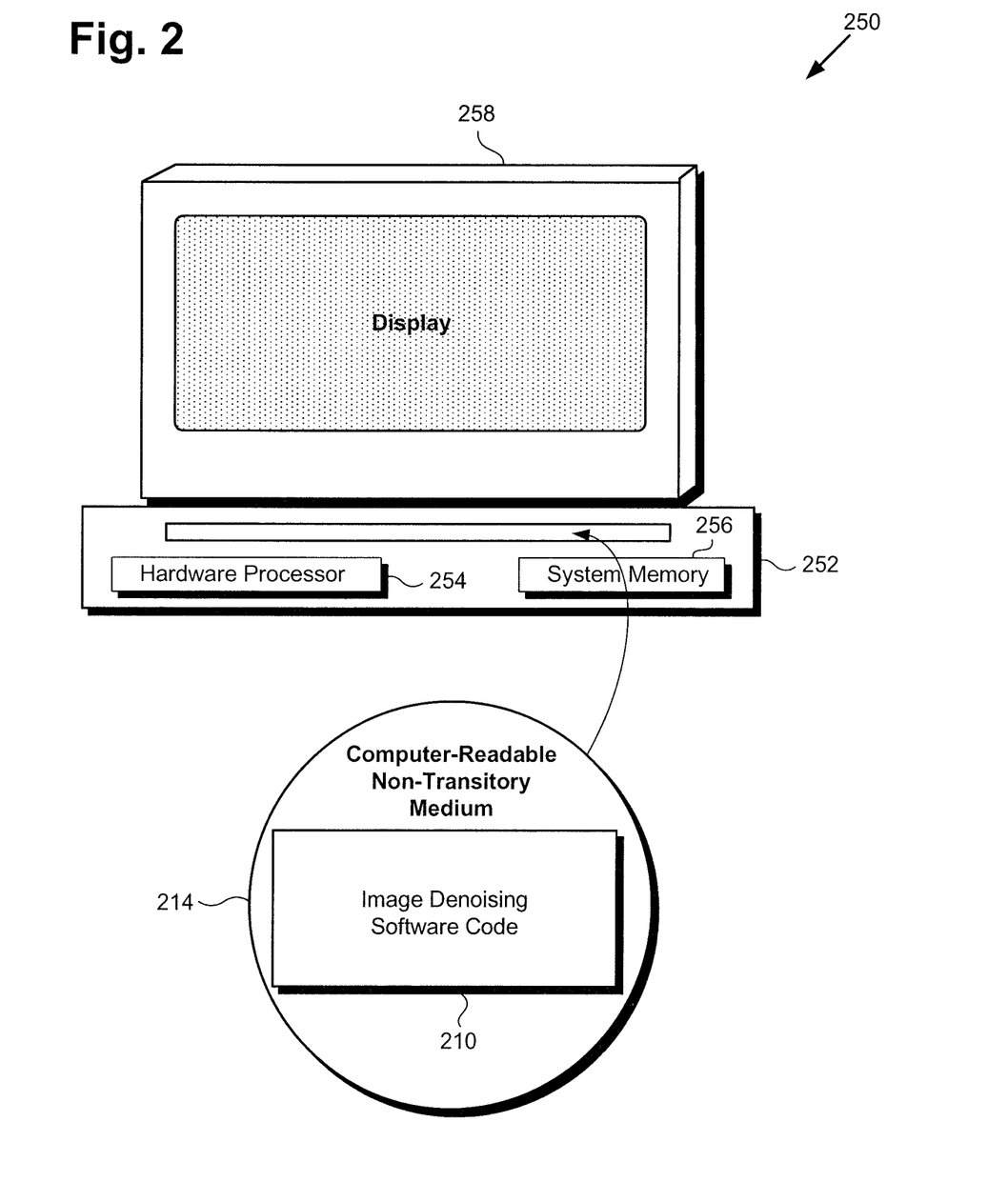
FIG. 2 shows an exemplary system and a computer-readable non-transitory medium including instructions for denoising binned-depth images, according to one implementation.

FIG. 2 shows exemplary system 250 and computer-readable non-transitory medium 214 including instructions for denoising binned-depth images, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to image rendering system 100 including computing platform 102 having hardware processor 104 and system memory 106, in FIG. 1. Consequently, system 250 may share any of the characteristics attributed to corresponding image rendering system 100 by the present disclosure.

Also shown in FIG. 2 is computer-readable non-transitory medium 214 having image denoising software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides image denoising software code 210 for execution by hardware processor 254 of computing platform 252. Image denoising software code 210 corresponds in general to image denoising software code 110, in FIG. 1, and is capable of performing all of the operations attributed to that corresponding feature by the present disclosure.

Figure 3:
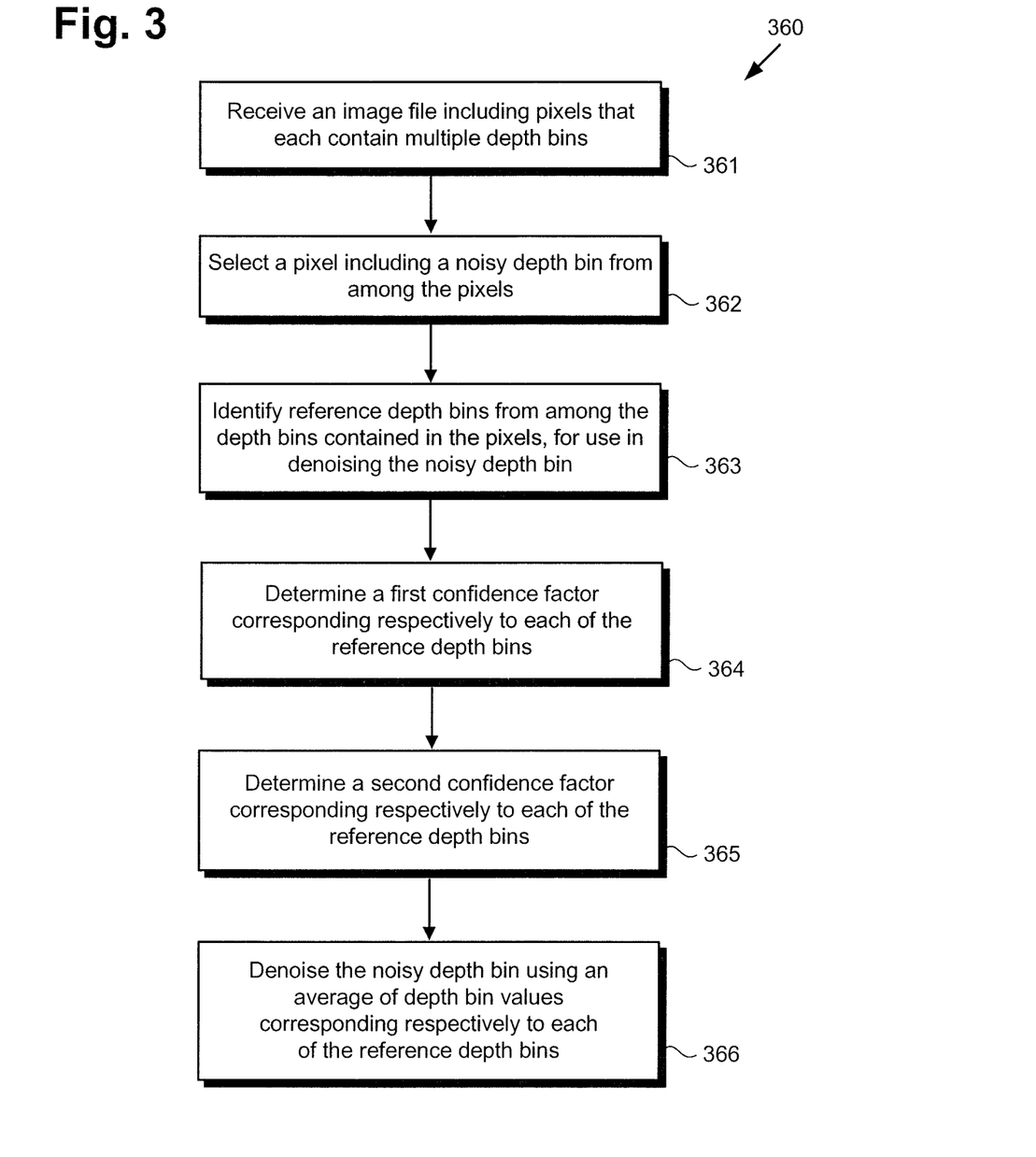
FIG. 3 shows a flowchart presenting an exemplary method for denoising binned-depth images, according to one implementation.

The functionality of image denoising software code 110/210 will be further described by reference to FIG. 3 in combination with FIGS. 1, 2, and 4. FIG. 3 shows flowchart 360 presenting an exemplary method for use by a system, such as image rendering system 100, in FIG. 1, or system 250, in FIG. 2, for denoising binned-depth images. With respect to the method outlined in FIG. 3, it is noted that certain details and features have been left out of flowchart 360 in order not to obscure the discussion of the inventive features in the present application.

Figure 4:
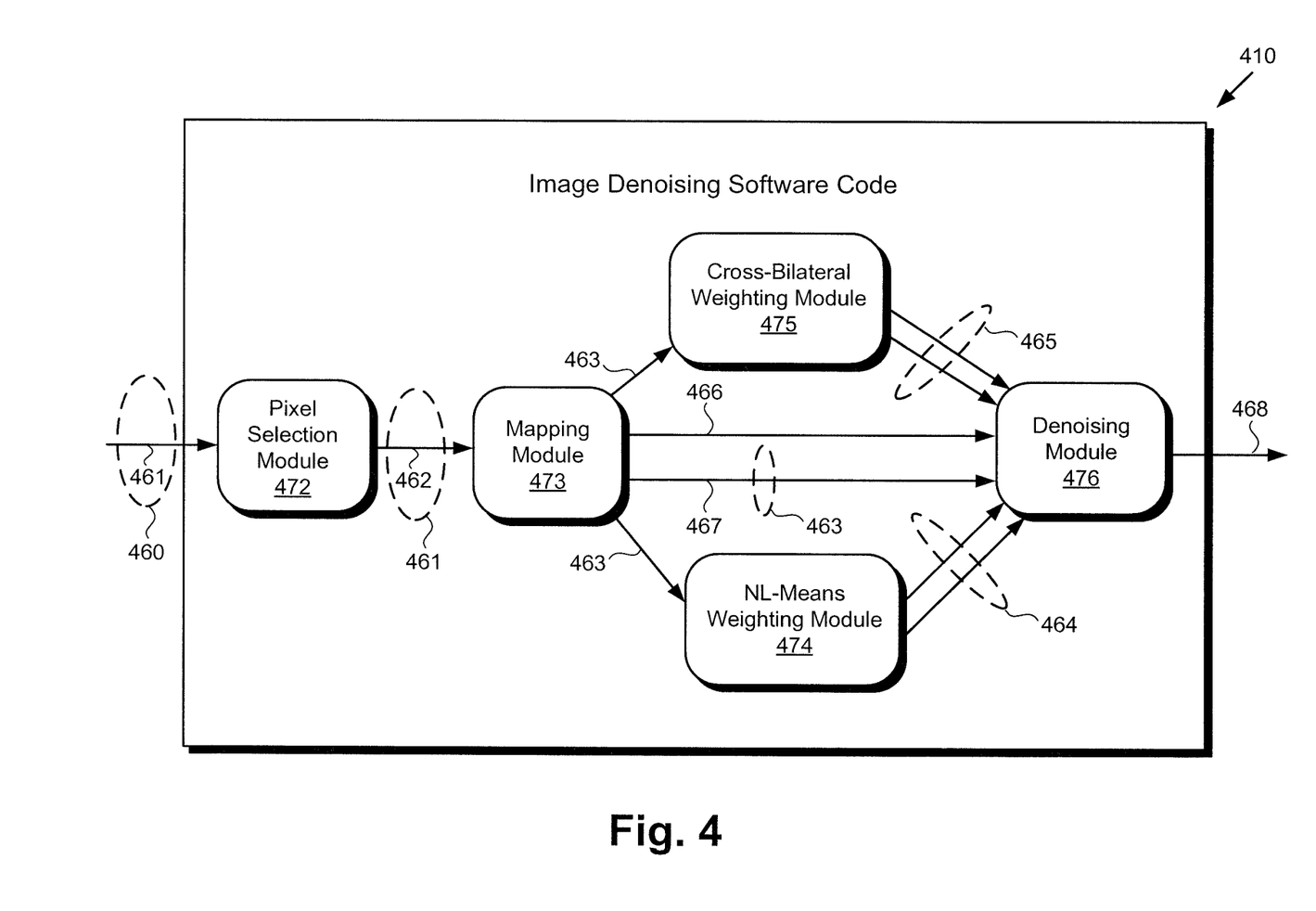
FIG. 4 shows an exemplary diagram of an image denoising software code suitable for execution by a hardware processor of the systems shown by FIGS. 1 and 2, according to one implementation.

FIG. 4 shows exemplary image denoising software code 410 suitable for execution by hardware processor 104/254 of the respective systems shown by FIGS. 1 and 2, according to one implementation. As shown in FIG. 4, image denoising software code 410 may include pixel selection module 472, mapping module 473, Nonlocal-Means (NL-Means) weighting module 474, Cross-Bilateral weighting module 475, and denoising module 476, for example. Also shown in FIG. 4 are image file 460 including multiple pixels 461 that include among them pixel 462 including noisy depth bin 466, mapping 463 including reference depth bins 467, confidence factors 464, confidence factors 465, and denoised deep image 468.

Image file 460 and denoised deep image 468 correspond respectively in general to image file 160 and denoised deep image 168, in FIG. 1, and may share any of the characteristics attributed to those corresponding features by the present disclosure. In other words, like image file 460, image file 160 contains multiple pixels 461, including pixel 462 containing noisy depth bin 466.

Moreover, image denoising software code 410 corresponds in general to image denoising software code 110/210, in FIGS. 1 and 2, and those corresponding features may share the characteristics attributed to any corresponding feature by the present disclosure. That is to say, like image denoising software code 410, image denoising software code 110/210 may include modules corresponding to exemplary pixel selection module 472, mapping module 473, NL-Means weighting module 474, Cross-Bilateral weighting module 475, and denoising module 476.

Referring now to FIG. 3 in combination with FIGS. 1, 2, and 4, flowchart 360 begins with receiving image file 160/460 (action 361). By way of example, user 140 may utilize user device 150 to interact with image rendering system 100, or may interact directly with system 250, in order to produce denoised deep image 168/468. As shown by FIG. 1, in one implementation, user 140 may do so by transmitting image file 160/460 from user device 150 to image rendering system 100 via communication network 108 and network communication links 118. Alternatively, image file 160/460 may be received from a third party source, or may be stored in system memory 106/256. Image file 160/460 may be received by image denoising software code 110/210/410, executed by hardware processor 104/254.

Image file 160/460 includes multiple deep pixels 461, i.e., pixels each of which contains multiple depth bins. It is reiterated that because each of pixels 461 may have multiple representative depths, processing all depths can be prohibitive. As a result, the individual representative depths within each of pixels 461 can be clustered or "binned," resulting in a reduced set of binned-depths, hereinafter referred to as "depth bin values," corresponding respectively to the depth bins. As noted above, having multiple depth bin values available to the compositor advantageously enables capabilities such as inserting atmosphere, or isolating color corrections and lighting adjustments to particular depths, while limiting the number of depth bin values through binning allows the processing of those depth bin values to remain tractable.

In addition to pixels 461, each containing multiple depth bins, image file 160/460 may also include the following data for each depth bin: the mean and variance of the color, albedo, normal and depth samples, as well as the alpha value, which are all features known in the art. In some implementations, the depth bin value clustering may be modified to cluster each distinct half of a single pixel's values into either one of two half sample buffers. For some rendering systems this facilitates computing variance of input color. It also makes it possible to estimate the remaining noise in the denoised result.

In some implementations, the color data of image file 160/460 may be decomposed into two separate values, one of which stores the diffuse data of image file 160/460 and the other of which stores the specular data of image file 160/460. In some implementations, this diffuse data may be divided by albedo to remove surface texture. Moreover, in some implementations, the diffuse and specular data may be denoised separately and may be recombined after denoising has been completed on the data contained in each, i.e., after the method outlined by flowchart 360 is completed on each of specular and diffuse data separately.

Flowchart 360 continues with selecting pixel 462 including noisy depth bin 466 from among pixels 461 (action 362). The selection of pixel 462 may be performed by image denoising software code 110/210/410, executed by hardware processor 104/254, and using pixel selection module 472.

In some implementations, it may be advantageous or desirable to denoise all, or substantially all of pixels 461 of image file 160/460. In some of those implementations, for example, pixel 462 may be selected arbitrarily from among pixels 461 of image file 160/460. Moreover, subsequent, to denoising of one or more noisy depth bins 466 of pixel 462, all, or substantially all other pixels 461 of image file 160/460 may be selected in turn to undergo denoising.

Flowchart 360 continues with identifying reference depth bins 467 from among the depth bins contained in pixels 461, for use in denoising noisy depth bin 466 (action 363). In one implementation, for example, noisy depth bin 466 is mapped to reference depth bins 467 in each of some or all of pixels 461, except for pixel 462 containing noisy depth bin 466. In one such implementation, mapping 463 may identify reference depth bins 467 as being those depth bins contained in a neighboring subset of pixels 461 that surround and/or adjoin pixel 462.

However, in other implementations, mapping 463 may identify reference depth bins 467 for use in denoising noisy depth bin 466 as including one or more depth bins also contained in pixel 462. That is to say, in some implementations, noisy depth bin 466 and one or more of reference depth bins 467 are contained in the same pixel 462 that includes noisy depth bin 466. Identification of reference depth bins 467 included in mapping 463 may be performed by image denoising software code 110/210/410, executed by hardware processor 104/254, and using mapping module 473.

Flowchart 360 continues with determining a first confidence factor 464 corresponding respectively to each of reference depth bins 467 (action 364). Identification of first confidence factors 464 may be performed by image denoising software code 110/210/410, executed by hardware processor 104/254, and using a confidence weighting module, such as exemplary NL-Means weighting module 474, for example.

In some implementation, as depicted in FIG. 4, each of first confidence factors 464 corresponding respectively to reference depth bins 467 may be determined as an NL-Means weight corresponding to each reference depth bin. In the interests of conceptual clarity, determination of an NL-Means weight for a flat pixel in a flat image will be described first, followed by an extension of that analytical framework to depth bins included in deep pixels 461.

For a noisy flat pixel p and a reference pixel q, the NL-Means weight applied to pixel q in the process of denoising noisy pixel p, i.e., $w_O(p, q)$, can be expressed using Equation 1:

$$w_O(p, q) = \exp^{-\|O_{\mathcal{P}_p} - O_{\mathcal{P}_q}\|^2}$$

where, $\|O\mathcal{P}_p - O\mathcal{P}_q\|^2$ measures the distance between square patches of pixels centered on pixels p and q. That distance, $\|O\mathcal{P}_p - O\mathcal{P}_q\|^2$, is the average distance between pairs of pixels in the patches $\mathcal{P}_p$ and $\mathcal{P}_q$, and may be expressed using Equation 2:

$$\|O_{\mathcal{P}_p} - O_{\mathcal{P}_q}\|^2 = \max\left(0, \frac{1}{|\mathcal{P}|} \sum_{n \in \mathcal{P}_0} d_O(p+n, q+n)\right)$$

where $|\mathcal{P}|$ is the number of pixels in a patch, $\mathcal{P}_0$ enumerates the offsets to the pixels within the patch, and $d_O(p, q)$ is the normalized square distance between pixels p and q as defined by Equation 3:

$$d_O(p, q) = \frac{1}{|O|} \sum_{i=1}^{|O|} \frac{\|O_{i,p} - O_{i,q}\|^2 - (\text{Var}_{i,p} + \min(\text{Var}_{i,p}, \text{Var}_{i,q}))}{\varepsilon + k_O^2 \cdot (\text{Var}_{i,p} + \text{Var}_{i,q})}$$

In Equation 3, $|O|$ is the number of channels in the noisy flat image, $O_{i,p}$ and $\text{Var}_{i,p}$ represent the respective value and the variance of the i-th channel of pixel p, $k_o^2$ is a user defined constant and ε is a constant preventing division by zero. As an example, ε may be equal to $10^{-10}$.

Extending the above analysis to depth bins in deep pixels 461, it is noted that given the unstructured nature of deep image data, NL-Means weights cannot be determined directly on the depth bin values of reference depth bins 467. Instead, when confidence factor 464 for a reference depth bin 467 includes an NL-Means weight, the NL-Means weight is computed on flattened deep data and confidence factor 464 is further based on an effective alpha value of the reference depth bin 467.

For noisy depth bin 466 in pixel 462, i.e. $p_b$, and reference depth bin 467 in pixel 461, i.e., $q_d$, confidence factor 464 applied to reference depth bin $q_d$ in the process of denoising noisy depth bin $p_b$, i.e., $w_O(p_b, q_d)$, can be expressed by Equation 4:

$$w_O(p_b, q_d) = w_O(p, q) \cdot w_\alpha(q_d)$$

where $w_O(p, q)$ is given by Equations 1, 2, and 3, above, and $w_\alpha(q_d)$ is the effective alpha of reference depth bin $q_d$ representing the relative contribution of the depth bin to the rendered flattened pixel.

Thus, in some implementations, confidence factor 464 for each of reference depth bins 467 may be based on an effective alpha value of the reference depth bin. Moreover, in some implementations, confidence factor 464 for each of reference depth bins 467 may include an NL-Means weight corresponding to the reference depth bin.

Flowchart 360 continues with determining a second confidence factor 465 corresponding respectively to each of reference depth bins 467 (action 365). Identification of second confidence factors 465 may be performed by image denoising software code 110/210/410, executed by hardware processor 104/254, and using another confidence weighting module, such as exemplary Cross-Bilateral weighting module 475, for example.

In some implementations, as depicted in FIG. 4, each of second confidence factors 465 corresponding respectively to reference depth bins 467 may be determined as a cross-bilateral weight corresponding to each reference depth bin. As was the case for the exemplary NL-Means weights discussed above, and again in the interests of conceptual clarity, determination of a cross-bilateral weight for a flat pixel in a flat image will be described first, followed by an extension of that analysis to depth bins included in deep pixels 461.

For a noisy flat pixel p and a reference pixel q, the cross-bilateral weight applied to pixel q in the process of denoising noisy pixel p, i.e., $w_F(p, q)$, is determined based on auxiliary features such as color, albedo, and normal, for example, and may be expressed using Equation 5:

$$w_F(p, q) = \exp^{-\|F_p - F_q\|^2}$$

with the distance between two pixels 461 being computed using the auxiliary feature f that substantially maximizes the dissimilarity between p and q. Specifically, the quantity $\|F_p - F_q\|^2$ may be expressed using Equation 6:

$$\|F_p - F_q\|^2 = \max_{f \in [1 \ldots |F|]} d_f(p, q)$$

where the "feature distance" $d_f(p, q)$ is defined by Equation 7:

$$d_f(p, q) = \frac{1}{|f|} \sum_{j=1}^{|f|} \frac{\|f_{j,p} - f_{j,q}\|^2 - (\mathrm{Var}_{j,p} + \min(\mathrm{Var}_{j,p}, \mathrm{Var}_{j,q}))}{k_f^2 \cdot \max(\tau, \mathrm{Var}_{j,p}, \|\mathrm{Grad}_{j,p}\|^2)}$$

Here, $|f|$ is the number of channels of feature f, $f_{j,p}$ and $\mathrm{Var}_{j,p}$ represent the respective value and variance of the j-th channel of pixel p, and $\|\mathrm{Grad}_{j,p}\|^2$ is the squared magnitude of the corresponding gradient clipped to a maximum user defined threshold τ and variance $\mathrm{Var}_{j,p}$.

Extending the above analysis to depth bins in deep pixels 461, the feature distance $d_f(p_b, q_d)$ with respect to depth bins $p_b$ and $q_d$ is defined by Equation 8:

$$d_f(p_b, q_d) = \frac{1}{|f|} \sum_{i=j}^{|f|} \frac{\|f_{j,p_b} - f_{j,q_d}\| - (\mathrm{Var}_{j,p_b} + \min(\mathrm{Var}_{j,p_b}, \mathrm{Var}_{j,q_d}))}{k_f^2 \cdot \max(\tau, \mathrm{Var}_{j,p_b}, \|\mathrm{Grad}_{j,p}\|^2)}$$

The final cross-bilateral weights $w_F(p_b, q_d)$ that may be used as second confidence factors 465 may be determined using Equations 5 and 6 by replacing p and q by $p_b$ and $q_d$, respectively, and by substituting Equation 8 for Equation 7. Thus, in some implementations, confidence factor 465 for each of reference depth bins 467 may be determined as a cross-bilateral weight of the reference depth bin.

Flowchart 360 can conclude with denoising noisy depth bin 466 using an average of the depth bin values corresponding respectively to each of reference depth bins 467 (action 366). Denoising of noisy depth bin 466 may be performed by image denoising software code 110/210/410, executed by hardware processor 104/254, and using denoising module 476.

It is noted that, in a streamlined version of the method outlined by flowchart 360, one or both of actions 364 and 365 may be omitted. Thus, in one implementation, first and second confidence factors 464 and 465 may not be utilized, and noisy depth bin 466 may be denoised using a simple average of depth bin values corresponding respectively to each of reference depth bins 467.

However, in implementations in which action 364 and/or action 365 is/are performed, the average of the depth bin values used to denoise noisy depth bin 466 may be a weighted combination of those depth bin values, where a weighting factor applied to each of the depth bin values includes one or both of first confidence factor 464 and second confidence factor 465. For example, the denoised depth bin value of noisy depth bin 466 of pixel 462, i.e., depth bin b of pixel p, expressed as $\hat{O}_{p_b}$, is given by Equation 9:

$$\hat{O}_{p_b} = \frac{1}{C_{p_b}} \sum_{q \in N_p} \sum_{q_d \in B_q} w(p_b, q_d) O_{q_d}$$

where the weighting factor $w(p_b, q_d)$ may equal first confidence factor 464, $w_O(p_b, q_d)$, given by Equation 4, or may equal second confidence factor 465, $w_F(p_b, q_d)$, derived from Equations 5, 6, and 8, or may equal some combination of $w_O(p_b, q_d)$ and $w_F(p_b, q_d)$. In one implementation, the weighting factor $w(p_b, q_d)$ may be equal to $\min[w_O(p_b, q_d), w_F(p_b, q_d)]$, for example.

The actions described above by reference to flowchart 360 may be performed for each noisy depth bin 466 of pixel 462, thereby denoising pixel 462. Moreover, the method described above can be iteratively applied to others of pixels 461, such as all or substantially all pixels 461, to produce denoised deep image 168/468.

Thus, the present application discloses a denoising solution for deep images. The present denoising solution utilizes reference depth bins in a neighborhood of a noisy depth bin to denoise the noisy depth bin. Denoising of the noisy depth bin is performed using an average of the depth bin values corresponding respectively to each of the reference depth bins. In addition, one or more confidence factors can be determined for expressing the average of the depth bin values used to denoise the noisy depth bin as a weighted combination of those depth bin values. Consequently, the present denoising solution advantageously preserves depth decompositions, thereby enabling the generation of high-quality, clean, denoised deep images.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image rendering system comprising:
  a computing platform including a hardware processor and a system memory;
  an image denoising software code stored in the system memory;
  the hardware processor configured to execute the image denoising software code to:
    receive an image file including a plurality of pixels, each of the plurality of pixels containing multiple depth bins each depth bin representing a different depth and having a corresponding color data;
    select a pixel including a noisy depth bin from among the plurality of pixels;
    identify a plurality of reference depth bins from among the multiple depth bins contained in the plurality of pixels, for use in denoising the noisy depth bin; and
    denoise the noisy depth bin using an average of depth bin values corresponding respectively to each of the plurality of reference depth bins.

2. The image rendering system of claim 1, wherein the plurality of reference depth bins are contained in a neighboring subset of the plurality of pixels that surround the pixel including the noisy depth bin.

3. The image rendering system of claim 1, wherein the noisy depth bin and at least one of the plurality of reference depth bins are contained in the pixel including the noisy depth bin.

4. The image rendering system of claim 1, wherein the hardware processor is further configured to execute the image denoising software code to determine a first confidence factor corresponding respectively to each of the reference depth bins based on an effective alpha value of the reference depth bin.

5. The image rendering system of claim 4, wherein the first confidence factor corresponding respectively to each of the reference depth bins comprises a Nonlocal-Means (NL-Means) weight corresponding to the reference depth bin.

6. The image rendering system of claim 4, wherein the hardware processor is further configured to execute the image denoising software code to determine a second confidence factor corresponding respectively to each of the reference depth bins as a cross-bilateral weight of the reference depth bin.

7. The image rendering system of claim 6, wherein the average of depth bin values used to denoise the noisy depth bin is a weighted combination of the depth bin values, and wherein a weighting factor applied to each of the depth bin values includes at least one of the first confidence factor and the second confidence factor.

8. A method for use by an image rendering system including a computing platform having a hardware processor and a system memory storing an image denoising software code, the method comprising:
  receiving, using the hardware processor, an image file including a plurality of pixels, each of the plurality of pixels containing multiple depth bins each depth bin representing a different depth and having a corresponding color data;
  selecting, using the hardware processor, a pixel including a noisy depth bin from among the plurality of pixels;
  identifying, using the hardware processor, a plurality of reference depth bins from among the multiple depth bins contained in the plurality of pixels, for use in denoising the noisy depth bin; and
  denoising, using the hardware processor, the noisy depth bin using an average of depth bin values corresponding respectively to each of the plurality of reference depth bins.

9. The method of claim 8, wherein the plurality of reference depth bins are contained in a neighboring subset of the plurality of pixels that surround the pixel including the noisy depth bin.

10. The method of claim 8, wherein the noisy depth bin and at least one of the plurality of reference depth bins are contained in the pixel including the noisy depth bin.

11. The method of claim 8, further comprising, determining, using the hardware processor, a first confidence factor corresponding respectively to each of the reference depth bins based on an effective alpha value of the reference depth bin.

12. The method of claim 11, wherein the first confidence factor corresponding respectively to each of the reference depth bins comprises a Nonlocal-Means (NL-Means) weight corresponding to the reference depth bin.

13. The method of claim 11, further comprising, determining, using the hardware processor, a second confidence factor corresponding respectively to each of the reference depth bins as a cross-bilateral weight of the reference depth bin.

14. The method of claim 13, wherein the average of depth bin values used to denoise the noisy depth bin is a weighted combination of the depth bin values, and wherein a weighting factor applied to each of the depth bin values includes at least one of the first confidence factor and the second confidence factor.

15. A computer-readable non-transitory medium having stored thereon instructions, which when executed by a hardware processor, instantiate a method comprising:
  receiving an image file including a plurality of pixels, each of the plurality of pixels containing multiple depth bins each depth bin representing a different depth and having a corresponding color data;

selecting a pixel including a noisy depth bin from among the plurality of pixels;

identifying a plurality of reference depth bins from among the multiple depth bins contained in the plurality of pixels, for use in denoising the noisy depth bin; and denoising the noisy depth bin using an average of depth bin values corresponding respectively to each of the plurality of reference depth bins.

16. The computer-readable non-transitory medium of claim 15, wherein the plurality of reference depth bins are contained in a neighboring subset of the plurality of pixels that surround the pixel including the noisy depth bin.

17. The computer-readable non-transitory medium of claim 15, wherein the noisy depth bin and at least one of the plurality of reference depth bins are contained in the pixel including the noisy depth bin.

18. The computer-readable non-transitory medium of claim 15, further comprising determining a first confidence factor corresponding respectively to each of the reference depth bins based on an effective alpha value of the reference depth bin.

19. The computer-readable non-transitory medium of claim 18, further comprising determining a second confidence factor corresponding respectively to each of the reference depth bins as a cross-bilateral weight of the reference depth bin.

20. The computer-readable non-transitory medium of claim 19, wherein the average of depth bin values used to denoise the noisy depth bin is a weighted combination of the depth bin values, and wherein a weighting factor applied to each of the depth bin values includes at least one of the first confidence factor and the second confidence factor.

* * * * *